United States Patent Office 3,845,179
Patented Oct. 29, 1974

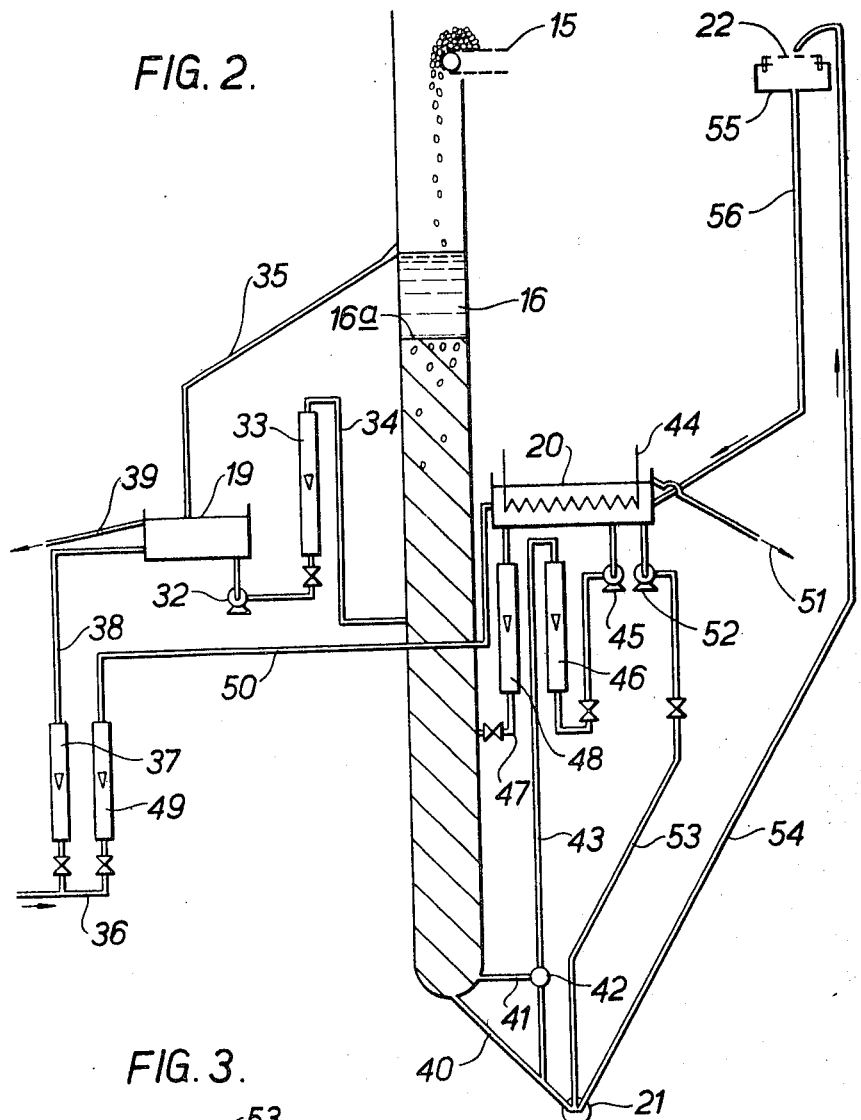
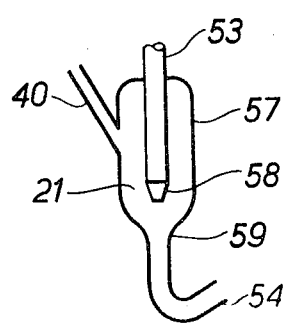

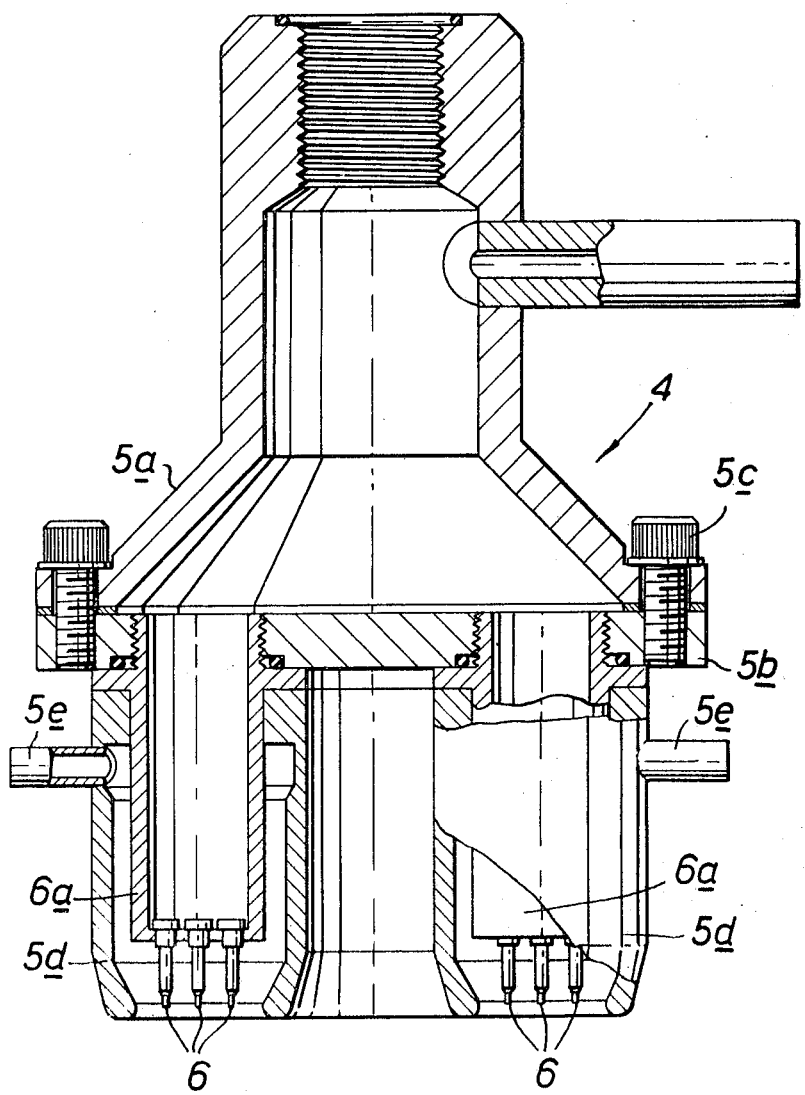

---

3,845,179
MAKING OF PARTICULATE SPHERES
Peter Frederick Wace, Oxford, England, assignor to United Kingdom Atomic Energy Authority, London, England
Continuation of abandoned application Ser. No. 26,512, Apr. 8, 1970. This application Oct. 30, 1972, Ser. No. 301,732
Claims priority, application Great Britain, Apr. 9, 1969, 18,297/69
Int. Cl. B01f 5/00
U.S. Cl. 264—14
2 Claims

ABSTRACT OF THE DISCLOSURE

An apparatus for forming particulate spheres wherein drops of a sol are caused to fall into a column containing a gelling liquid and the gelled drops are discharged at the bottom of the column at a controlled rate and hydraulically lifted and passed to washing and drying devices.

---

Figure 1:
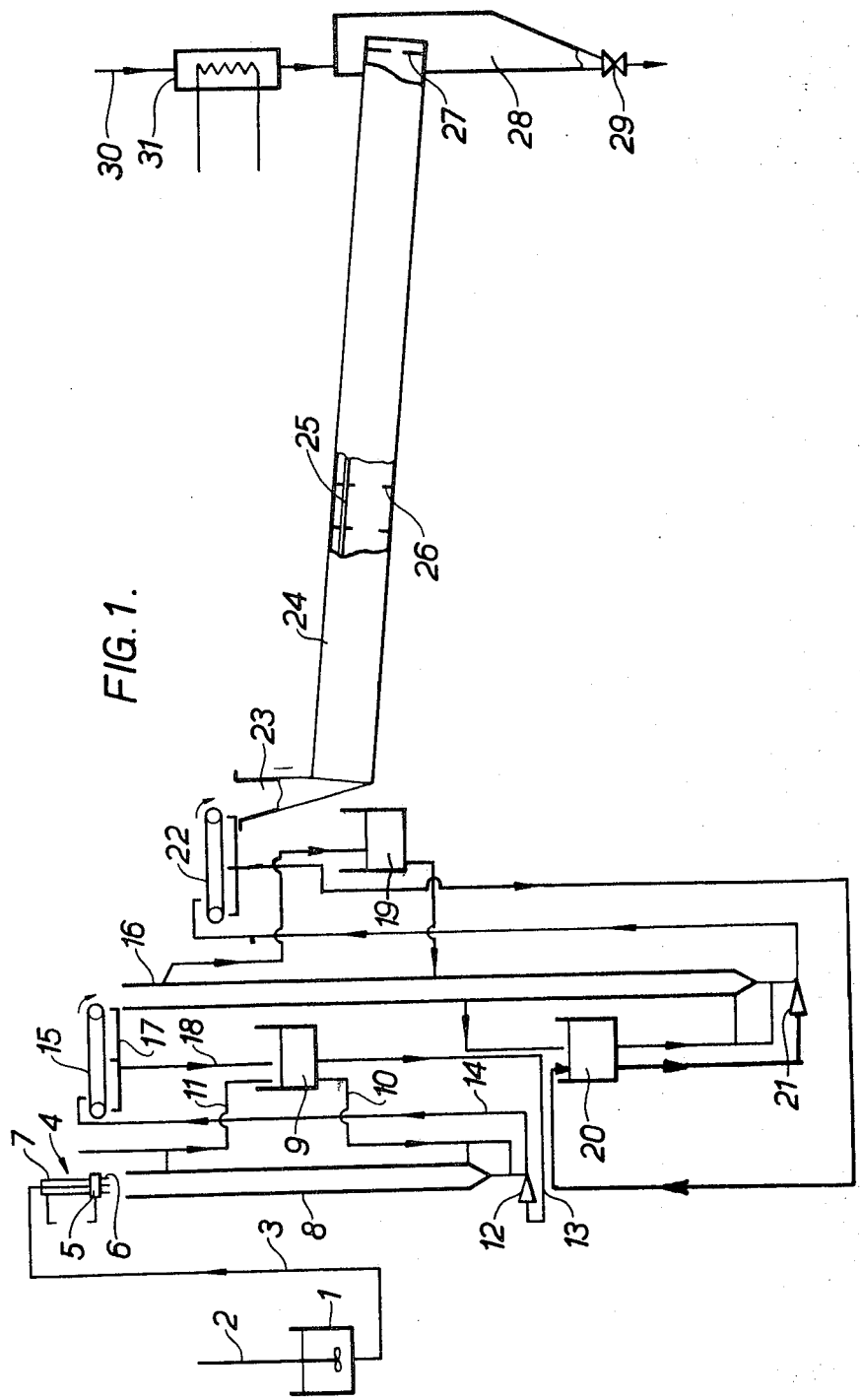

This is a continuation, of application Ser. No. 26,512 filed Apr. 8, 1970, now abandoned.

The present invention relates to the making of particulate spheres by gel processes, two of which are known as the 'sol-gel' process and the 'gel-precipitation' process.

In the sol-gel process a sol containing metal ions (as described in our co-pending Pat. Ser. No. 643,348) or non-metal (e.g. silicon-containing) ions, and a sub-stoichiometric amount of counterions, and optionally additives which may include carbon or carbon-containing compounds to undergo subsequent chemical reaction (e.g. to give carbides) or to introduce porosity, is injected in the form of spheres into a gelling liquid. The gelling liquid may be an acid, a base, or a dehydrating organic liquid as appropriate.

The gel-precipitation process uses a solution of a metal salt, or a metal sol, or a non-metal compound (e.g. sodium silicate), and optionally other compounds (e.g. carbon) together with a carbon-containing compound (called a 'modifying agent' in our U.S. Pat. No. 3,495,954 and co-pending Pat. Ser. No. 747,800 which is known to convert the liquid mix into a stable gel configuration (e.g. spheres) when injected into a strong liquid base or acid as appropriate.

It is an object of the present invention to provide apparatus for making particulate spheres by a gel process as above defined.

According to the present invention there is provided apparatus for making particulate spheres comprising a column, drop-forming means adjacent to the upper end of the column, means to supply a mix to such drop-forming means, means to supply a gelling liquid to the column, a channel for the passage of spheres from adjacent the base of the column, duct means by-passing said channel, and means proportioning the flow of gelling liquid between the channel and said duct means thereby to control the outflow of spheres from the column.

Very desirably an essentially similar column is used for washing the spheres after formation but it will be appreciated that this washing column does not have drop-forming means associated with it and the liquid in this column is not a gelling liquid.

Very conveniently, the drop-forming means comprises a manifold to which the mix is supplied and to which is connected a plurality of downwardly-directed nozzles of a size suited to the size of drops that it is desired to form.

This invention will be described hereinafter with particular reference to the formation of uranium dioxide spheres from a feed of uranyl fluoride containing a water-soluble starch derivative. This particular mix, and many other mixes, is visco-elastic and non-Newtonian, which means that it has extremely undesirable characteristics for supply to drop-forming means as above described. The drop-forming means are therefore desirably associated with a heater which will heat the mix to a temperature in the region of 65° C. and thus destroy its non-Newtonian characteristics and reduce its visco-elastic properties. The simple expedient of heating the sol therefore considerably assists the problem of forming drops.

In the preferred embodiment the gelling liquid is aqueous ammonia and it will be known that this is liable to give rise to ammonia vapours at the free surface. These ammonia vapours may react with the drops of sol as they are being formed with somewhat undesirable results. To prevent this the needles are surrounded with an air or inert gas plenum chamber having openings directed towards the nozzle orifices so that the drops as they are formed are formed in a curtain of gas. An alternative is to cover the upper surface of the gelling liquid with an organic liquid immiscible therewith but which has an interfacial tension such that the drops of sol will fall freely therethrough. Such an organic liquid is decane mixed with a proportion of decanol.

In order to remove the spheres from the column, they are allowed to flow out of the said channel under controlled conditions and then pass to an ejector pump which uses a liquid lift to convey them to the next stage in the process. It will be appreciated that these spheres are relatively soft or rubbery and can easily be damaged, moreover they are inclined to stick to surfaces and a liquid lift has been found to be most effective.

After gelling and washing, the spheres require to be dried, and for that purpose we provide a rotary oven which comprises a generally cylindrical shell which is rotatable about its axis and which is provided with a plurality of axially arranged rods secured, by means of baffle plates, adjacent to the inner surface of the cylinder. These rods and baffle plates ensure substantially plug flow through the oven but also ensure adequate mixing. In order to control the hold-up in the oven and therefore the time of residence, the oven is inclined and its lower outlet end is provided with a weir or baffle which controls the outflow of the dried spheres. This oven may operate at an exit temperature of 100–150° C. if drying only is required, or it may operate with an exit temperature in the region of 450° C. if partial reaction is required.

In order that the present invention may more readily be understood, the same will now be described with reference to the accompanying drawings which are given by way of example. In the drawings, FIG. 1 is a schematic plant flow sheet, FIG. 2 shows certain portions of the flow sheet, FIG. 3 shows a portion of FIG. 2 in more detail and FIG. 4 shows a portion of FIG. 1 in more detail.

Referring now to the drawings, the apparatus comprises a container 1 for mix, this container being provided with a stirring device 2 and being connected by line 3 to drop-forming means 4. These drop-forming means comprise a manifold 5 to which is connected a plurality of hypodermic needles 6, the supply to the means 4 passing through a heated enclosure 7.

The drop forming means is shown in greater detail in FIG. 4 in which the manifold 5 consists of a funnel shaped member 5a closed by a plate 5b secured by screws 5c. Screwed into the plate 5b are four nozzles 6a (two only can be seen in the figure) each mounting seven hypodermic needles 6 and around the nozzles 6a is a shroud 5d secured by a grub screw (not shown). The shroud thus forms a plenum chamber around the needles. Inlet pipes 5e on the shroud 5d are for the connection of a compressed air supply so that in operation a curtain of air issues around the nozzles and prevents the ammonia vapours in the column from reaching the drops of sol as they are formed at the tips of the needles 6.

The drop-forming means 4 is located above a column 8 which is supplied at its lower portion with aqueous ammonia from a tank 9 via a pipe 10, the ammonia being withdrawn by a pipe 11 from the upper portion of the column 8 and being re-circulated to the tank 9. Located below the column 8 is an ejector 12 which is fed by a pipe 13 from the tank 9 and which lifts spheres from the column 8 through a pipe 14 to a mesh conveyor 15.

The spheres falling onto this conveyor 15 are fed to the top of a second column 16, whilst the ammonia draining from them is collected by a tray 17 and passed by a pipe 18 back to the ammonia tank 9. The column 16 is essentially similar to the column 8 and will be described in detail with reference to FIG. 2. In essence, however, the column 16 has associated with it a cold water tank 19 which supplies cold water to the upper part of the column 16 and a hot water tank 20 which supplies hot water to the lower part of the column 16. Spheres leaving the column 16 are forwarded by an ejector 21 to conveyer 22, which is similar to conveyor 15.

Spheres falling off the end of the conveyer 22 pass to a hopper 23 and thence to the entry of a rotary oven 24. As will be seen, this rotary oven is inclined at an angle to the horizontal and means (not shown) are desirably provided for adjusting the angle of inclination. Within the oven there are provided a plurality of longitudinally extending rods 25 (three being a convenient number) which are located close to or touching the inner surface of the oven and which are held in place by a plurality of baffle plates 26 of annular form. This arrangement ensures that the spheres passing down the oven are tumbled but that the flow is substantially plug flow.

Towards the lower end of the oven, there is an annular weir or end baffle 27 which controls the residence time of the spheres within the oven. The spheres passing over the weir 27 fall into a collecting hopper 28 from whence they are removed by a valve 29. The oven is heated by hot air which is supplied to the collecting hopper 28 via a pipe 30 and heater 31.

Referring now to FIG. 2, which shows the column 16 in more detail, it will be seen that the column is of generally cylindrical form, some 4 feet high and 1½ inches in internal diameter. In essence, this column comprises two columns which are superimposed for the sake of simiplicity. The upper part of the column is used for a cold water wash, the cold water being derived from the tank 19, whilst the lower portion is used for a hot water wash which is derived from the tank 20. The cold water from the tank 19 is passed by a pump 32 to a flow-measuring device 33 and thence via a pipe 34 to approximately the middle point of the column 16. The cold water flows upwardly through the column at a rate of approximately 600 ml. per minute and is withdrawn from the upper part of the column through a pipe 35 which directs it back to the cold water tank. The conditions within the column are such that there is a free space of approximately 6 inches below the connection point of the pipe 35 to the upper level of the spheres within the column, so that spheres dropping off the conveyer 15 are decelerated in these 6 inches of water before coming to rest on the top of the bed of spheres in the column.

A cold water supply pipe 36 is provided and a flow control device 37 supplies a controlled amount of cold water to the water tank 19 through a pipe 38, an overflow pipe 39 conveying an equivalent amount of cold water to waste.

The base of the column 16 is provided with a channel 40 for the outflow of spheres, this channel being constituted by a pipe which is very approximately axial to the column 16. Adjacent the base of the column 16 is a duct 41 for the inflow of hot water and the channel 40 and duct 41 are connected by a proportioning valve diagrammatically illustrated at 42, this valve being supplied with hot water through a pipe 43. It will be seen that for a constant flow of hot water through the pipe 43 the setting of the valve 42 controls the amount of this hot water which passes respectively through the channel 40 and duct 41. There is substantially no tendency for the spheres to pass out of the duct 41 but they would pass freely down the channel 40 were it not for the inflow of water. Proportioning valve 43 is set, desirably automatically, so that the spheres pass out of the channel 40 at the same rate as they are delivered by the conveyer 15.

The hot water tank 20 is provided with a heater 44 and a pump 45 passes hot water from the tank 20 through a flow control device 46 to the pipe 43, the flow being set at 600 ml. per minute. The hot water is withdrawn from the column 16 via a pipe 47 and flow control device 48 and delivered back to the hot water tank 20. The flow control device 48 is set also at 600 ml. per minute and in practice there is substantially no mixing of the hot and cold water fed to the column 16. A further flow control device 49 connected to the pipe 36 controls the supply of cold water to the hot water tank 20 through a pipe 50, excess overflowing through an overflow pipe 51.

Spheres passing down the channel 40 are fed to the ejector pump 21, which is illustrated in more detail in FIG. 3, this ejector pump being supplied with hot water from the tank 20 by a pump 52 and pipe 53 and raising the spheres by a pipe 54 to the second conveyer 22. This conveyer 22 has a drain tray 55 beneath it and a pipe 56 collects the hot water draining from the spheres and conveys it back to the hot water tank 20.

Referring now to FIG. 3, it will be seen that the ejector comprises a generally elliptical body 57 which is provided with an inclined intake coupled to the channel 40. The arrangement is such that there is substantially no flow of liquid in the channel 40, beyond the point of delivery of the valve 42 and therefore the spheres fall freely into the body 57. The pipe 53 has a nozzle 58 at its lower end directed into a flared inlet 59 giving to the pipe 54. The spheres within the body 57 are entrained by the liquid flow entering the inlet 59 and pass up the pipe 54.

It will be appreciated that the means for controlling the outflow of spheres and the liquid lift arrangements described with reference to FIGS. 2 and 3 are employed at the bottom of column 8 but that in that case the lift liquid is aqueous ammonia instead of hot water.

In using the apparatus above described for making spheres of uranium dioxide, we prefer to use as a mix an aqueous solution of uranyl fluoride comprising 625 gm. of uranyl fluoride per litre and 94 gm. per litre of a water-soluble starch derivative and 100 gm. per litre of ethylene glycol. The column 8 is constructed so that the spheres have a residence time of about 30 minutes in this column and during that time they are subjected to an upward flow of ammonium hydroxide at 600 ml. per minute, which is approximately three-quarters of the velocity necessary to obtain fluidisation. The spheres are therefore largely supported by the upflow of ammonia so that the mass of spheres in the column does not cause distortion and sticking. Substantially the same conditions apply in the column 16.

In place of the column 16, it is possible to use a screen conveyer or a plurality of such conveyers in association with sprays in order to obtain the necessary washing efficiency. In processing nuclear fuel, where criticality conditions tend to be controlling, it may be preferable to use a conveyer for large scale operations rather than a plurality of columns, since it is easier to construct a conveyer to ever-safe dimensions. The expedient of using a single large diameter column to obtain increased through-puts is of course undesirable with highly enriched fissible material.

I claim:

1. A method of preparing particulate spheres by the gelling of liquid drops comprising feeding a gellable liquid mix to a drop forming means disposed adjacent the upper end of a cylindrical column containing a gelling liquid capable of causing said gellable liquid to gel, forming drops of gellable liquid above the level of the gelling liquid and independently of any concurrent flow of gelling liquid, allowing the drops so formed to contact the gelling liquid so as to form gel spheres, feeding gelling liquid to the column through both a valveless gel sphere outlet channel extending below the base of the column and an inlet adjacent the base, so as to produce a non-fluidising upward flow in the column, allowing said gel spheres to pass down the column countercurrent to the gelling liquid, and proportioning the flow of gelling liquid into the column between the channel and the inlet thereby to control the outflow of gel spheres from the column through said valveless outlet channel, the greater the inflow through the channel compared with that through the inlet the smaller the outflow of gel spheres from the column.

2. A method as claimed in claim 1, wherein a curtain of gas is discharged around the drop forming means.

References Cited
UNITED STATES PATENTS

| | | | |
|---|---|---|---|
| 2,652,386 | 9/1953 | Wallman | 264—14 X |
| 3,290,122 | 12/1966 | Clinton | 23—271 |
| 3,331,898 | 7/1967 | Haas | 23—271 |
| 3,380,894 | 4/1968 | Flack | 23—271 |

NORMAN YUDKOFF, Primary Examiner

S. J. EMERY, Assistant Examiner

U.S. Cl. X.R.

264—13; 252—315, 317, 301.1 S; 423—659; 23—270 R, 271 M.S., 313